United States Patent [19]
Luther et al.

[11] Patent Number: 5,966,485
[45] Date of Patent: Oct. 12, 1999

[54] METHOD OF PRODUCING CORE PROTRUSION RELATIVE TO CLADDING IN AN OPTICAL FIBER OF A FIBER OPTIC CONNECTOR

[75] Inventors: James P. Luther; Eric W. Kent; Karl M. Wagner, all of Hickory, N.C.

[73] Assignee: Siecor Corporation, Hickory, N.C.

[21] Appl. No.: 08/754,882

[22] Filed: Nov. 22, 1996

[51] Int. Cl.[6] .............................. G02B 6/26; B32B 31/00
[52] U.S. Cl. .............................. 385/85; 385/78; 156/153; 156/272.8; 219/121.68; 451/41
[58] Field of Search .............................. 385/31–38, 139, 385/85, 78; 451/41, 57, 364, 286; 156/153, 272.8; 219/121.17, 121.61, 121.66, 121.68

[56] References Cited

U.S. PATENT DOCUMENTS

| | | | |
|---|---|---|---|
| 4,265,699 | 5/1981 | Ladany | 385/35 |
| 4,272,926 | 6/1981 | Tamulevich | 451/286 |
| 4,492,060 | 1/1985 | Clark | 451/41 |
| 4,510,005 | 4/1985 | Nijman | 156/221 |
| 4,905,415 | 3/1990 | Moulin | 451/276 |
| 5,007,209 | 4/1991 | Saito et al. | 451/41 |
| 5,226,101 | 7/1993 | Szentesi et al. | 385/85 |
| 5,317,661 | 5/1994 | Szentesi et al. | 385/31 |
| 5,421,928 | 6/1995 | Knecht et al. | 156/153 |
| 5,566,262 | 10/1996 | Yamane et al. | 385/33 |

OTHER PUBLICATIONS

M. Kawachi, T. Edahiro and H. Toba, *Microlens Formation on VAD Single–Mode Fibre Ends,* Electronics Letters, vol. 18, No. 2, Jan. 21, 1982, pp. 72–73.

*Primary Examiner*—Hemang Sanghavi

[57] ABSTRACT

A method for providing core protrusion relative to cladding in an optical fiber mounted in a fiber optic connector includes the step of etching the end face of the fiber with a solution which preferentially removes the cladding from around the core of the optical fiber so that the core protrudes beyond the cladding. Additional steps may include fine polishing the end of the core in order to provide a relatively even end on the core and/or irradiating the end of the optical fiber with a laser in order to smooth the end of the core, thereby facilitating contact with the end of the second optical fiber in a fiber optic connector. As a result, according to the present invention a fiber optic connector with a protruding core is also provided. The core protrudes beyond the end of the cladding to improve contact and thus reduce reflectance when mated with a second fiber optic connector.

17 Claims, 3 Drawing Sheets

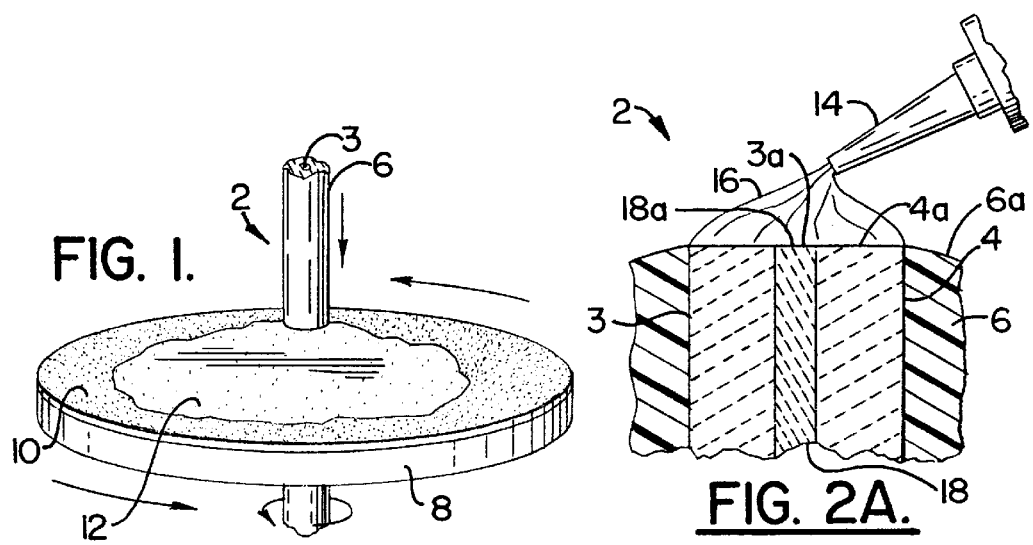
FIG. 1.
FIG. 2A.
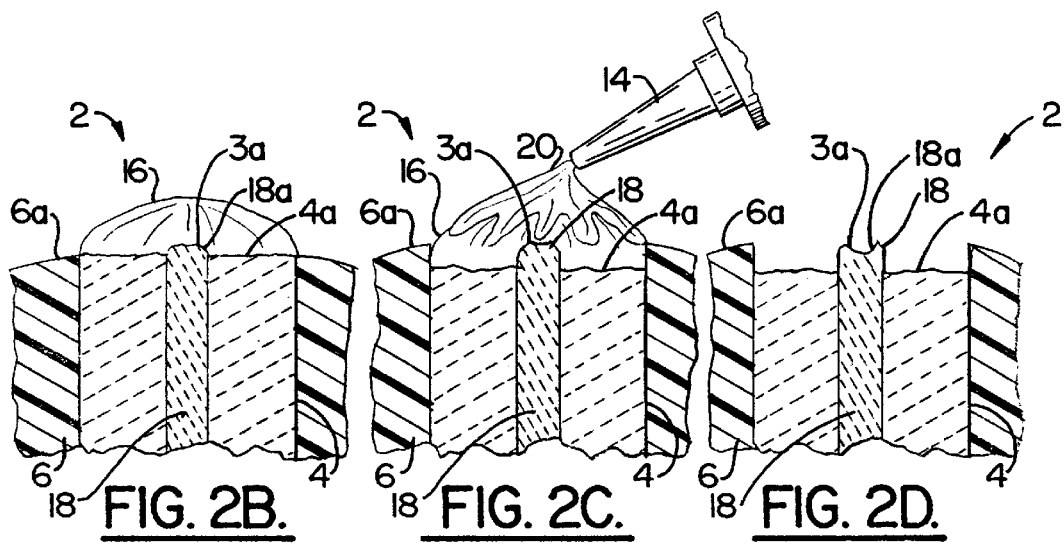
FIG. 2B.  FIG. 2C.  FIG. 2D.
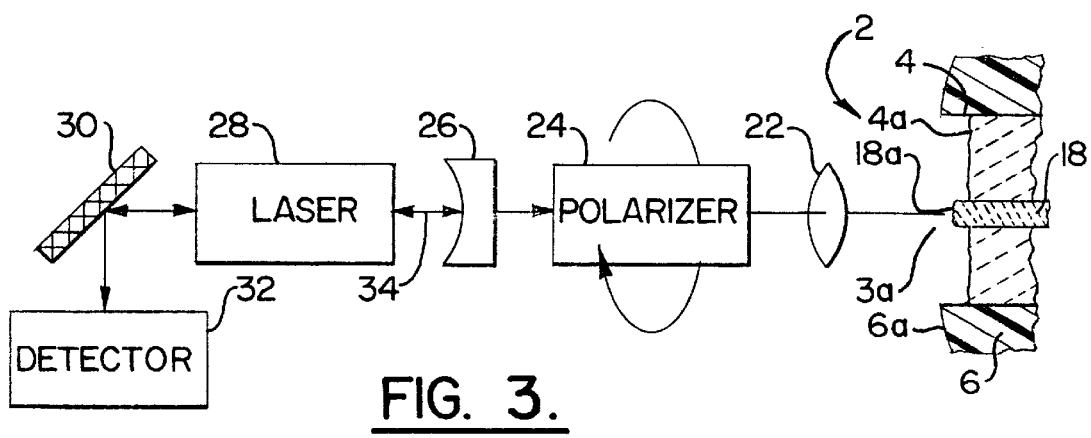
FIG. 3.

METHOD OF PRODUCING CORE PROTRUSION RELATIVE TO CLADDING IN AN OPTICAL FIBER OF A FIBER OPTIC CONNECTOR

BACKGROUND OF THE INVENTION

The present invention relates generally to a method for producing core protrusion relative to the cladding in an optical fiber mounted in a ferrule of a fiber optic connector. The present invention also relates generally to a fiber optic connector which includes an optical fiber having such core protrusion.

Optical fibers are widely used in a variety of data transmission applications including, primarily at the present, the telecommunications industry. Because optical fibers transmit voice and other data far more rapidly and efficiently than copper wire, the demand for optical fibers is continuing to increase. For example, optical fibers no longer serve merely as the medium for long distance signal transmission but are increasingly routed directly to the home or, in some instances, directly to a desk or other work location to network computers. These fiber optic networks incorporate a number of remateable connectors instead of permanent splices in order to provide flexibility in revising or upgrading the networks. The remateable connectors generally include an optical fiber which is held in a 2.5 mm zirconia or stainless steel ferrule by an adhesive.

Because these remateable connectors are a source of reflectance, efforts have been focused on improving the relative geometry between the optical fibers and the ferrule in the connectors in order to improve connector reflectance. Due to the small size of the optical fibers, maintaining exact tolerances, generally measured in terms of microns ($\mu$m) or nanometers (nm), is very critical but extremely difficult to do.

Present methods of processing the ends of the fiber optic connectors to achieve a desired end surface geometry include mechanical polishing, including grinding, and laser polishing are well known. Generally, the mechanical polishing methods disclose polishing the entire ferrule together with the optical fiber. For example, U.S. Pat. No. 5,007,209 to Saito et al., U.S. Pat. No. 4,905,415 to Moulin, U.S. Pat. No. 4,492,060 to Clark, and U.S. Pat. No. 4,272,926 to Tamulevich disclose mechanical polishing methods. In addition, commercial machines are available for mechanically grinding or polishing fiber optic connectors from Seikoh Geiken or others. Polishing pads, films, and slurries are also commercially available.

The surface of the polishing pads or films are made of various types of material for use with particular applications as is well known in the art. For example, carborundum film is used for removing adhesive from the fiber optic connector and for convex forming. Diamond films are used for convex forming, rough polishing, and medium polishing. Aluminum film is used for fine polishing. Polishing time varies from 1 to 1.2 minutes for adhesive removal and convex forming to 0.4 to 0.5 minutes for final polishing. As is well known in the art, applying the proper amount of pressure on the ferrule during polishing is important to obtain the desired convex surface on the end of the ferrule.

Standard published mechanical polishing steps include removing excess adhesive used to hold the optical fiber in place, along with any excess optical fiber, followed by convex forming which is the most important step in the mechanical polishing process. The end of the ferrule is inspected after convex forming to ensure proper convex formation of the end face of the ferrule. Next, additional polishing using diamond film and distilled water is performed. Final polishing is then accomplished using aluminum film and distilled water. The polished end of the ferrule is then inspected with a 100 power microscope to verify that the mechanical polishing has been properly completed, i.e. that a relatively smooth convex surface has been formed on the end of the ferrule with the optical fiber at the center or apex of the convex end of the ferrule.

To further improve fiber optic geometry, other methods of polishing the optical fiber and the connector have been developed which focus on the ferrule/fiber geometry, i.e, the relative position of the end of the fiber and the end of the ferrule, including polishing with a laser as disclosed in U.S. Pat. No. 5,226,101 to Szentesi et al., and U.S. Pat. No. 5,317,661 to Szentesi et al. In particular, a laser beam is directed to the end of the optical fiber in order to vaporize some of the glass at the end thereby reducing reflectance of the optical fiber by providing a smooth surface at the end of the fiber. U.S. Pat. No. 5,317,661 discloses a method of mechanically polishing the fiber optic connector followed by laser polishing the end of the optical fiber in the fiber optic connector. According to this method, the light beam from a $CO_2$ laser operating in a low duty cycle pulsed mode of operation is repeatedly directed on the end of the optical fiber and the fiber optic connector. Repeated pulses from the $CO_2$ laser directed to the optical fiber vaporize the end of the optical fiber while avoiding bulk melting of the end of the optical fiber.

Additionally as disclosed in U.S. Pat. No. 5,421,928 to Knecht et al., a laser may be used to prepare the end of a fiber optic connector having an optical fiber held therein by removing a portion of the optical fiber tip, both core and cladding, projecting beyond the connector end a predetermined distance. Excess adhesive may also be removed from the end of the connector by this process.

While mechanical polishing followed by laser polishing generally provides acceptable fiber optic end face geometry, potential disadvantages exist. Applicants have discovered a principal disadvantage of the above-mentioned two-step, mechanical/laser process is that the polishing steps may cause the core of the optical fiber to be recessed below the cladding of the optical fiber thereby creating an air gap between the cores of the optical fibers which increases reflectance in mated connectors. In some cases, a recess or undercut may be formed in the core itself. First, mechanical polishing may cause undercutting of the core of the optical fiber in the connector ferrule. Second, over processing of the fiber with a laser may also result in preferential removal of material from the core of the optical fiber itself which may create an air gap from between about 1–5 nm or more between the cores of mated connectors. As a result of these disadvantages, present connector reflectance values after mechanical and laser polishing run between about −60 to −65 dB.

Therefore, while methods exist for polishing optical fibers in fiber optic connectors, they do not meet the increasing demands for fiber optic connectors with improved return loss performance, i.e., lower reflectance. By improving return loss performance, the rate and accuracy of data transmission may be improved. Present mechanical and laser methods for polishing optical fibers have been optimized to the extent that little improvement in return loss performance can be achieved using these methods alone. As a result, other methods for polishing the end of the optical fiber mounted in a fiber optic connector must be developed to improve return loss performance of these remateable connectors.

SUMMARY OF THE INVENTION

It is therefore an object of the present invention to provide a method for polishing optical fibers in fiber optic connectors to avoid or eliminate undercut or depressions in the optical fiber core or of the core relative to the cladding of the fiber.

It is another object of the present invention to provide a method for polishing optical fibers to produce core protrusion relative to the cladding of the optical fiber for use primarily in fiber optic connectors, thereby improving return loss performance of the connector.

It is yet another object of the present invention to provide a fiber optic connector having improved return loss performance.

These and other objects are provided, according to the present invention, by a method of producing core protrusion relative to the cladding in an optical fiber which is preferably mounted in a fiber optic connector. The optical fiber has a core surrounded by a cladding layer with the core and the cladding extending between two opposed ends. The method includes the steps of etching a first end of the core and a first end of the cladding of the optical fiber with a solution. The etching step preferentially removes the cladding layer from around the core so that the end of the core protrudes beyond the end of the cladding. Next, the first end of the core is smoothed by fine polishing in order to provide a relatively even first end on the protruding core. Alternatively, the first end of the core may be smoothed by irradiating with a laser or by a combination of fine polishing and irradiating with a laser.

The step of fine polishing preferably includes polishing the first end of the protruding core with a film or pad to provide a relatively even surface on the first end of the protruding core. More preferably, the first end of the core is fine polished with a colloidal silica slurry having a pH of between about 8 and 11 and, more preferably, about 10.5.

In a preferred embodiment, the etching step performed prior to the fine polishing step includes etching the first end of the core and the first end of the cladding of the optical fiber for a period of about 1 to 600 seconds. In another preferred embodiment, the etching step is terminated once the end of said core protrudes beyond the end of the cladding between about 5 to 500 nanometers. The etching step is terminated by applying a neutralizing solution to the first ends of the core and cladding. The neutralizing solution may be any solution which will react with the etching solution to terminate the etching process. Alternatively, the etching step may be terminated by washing the optical fiber with water.

According to one embodiment of the invention, the fine polishing step is followed by the step of irradiating the protruding core with a laser to smooth the core in order to facilitate contact with the end of a core of a second optical fiber. In addition, the end of the optical fiber can be rough polished with a lapping film or slurry of fumed silica on a pad prior to the etching step in one preferred embodiment.

Another advantageous embodiment of the present invention is a fiber optic connector which may be fabricated according to the above-described method. The fiber optic connector comprises a ferrule and an optical fiber. The optical fiber has a core surrounded by a cladding layer wherein the core protrudes beyond the cladding. The protruding core is prepared by etching a first end of the core and a first end of the cladding of the optical fiber with a solution. The etching step comprises preferentially removing the cladding from around the core so that the end of the core protrudes beyond the end of the cladding.

In a preferred embodiment, the first end of the core is smoothed, following the etching step, so that the first end of the core can be operably mated to a core of another optical fiber. The smoothing step preferably comprises fine polishing the first end of said core to provide a relatively even first end of said protruding core. Alternatively, the smoothing step comprises irradiating said protruding core with a laser or a combination of fine polishing and irradiating.

Yet another embodiment of the present invention includes a lengthwise extending ferrule having opposed first and second ends and further defining a bore extending lengthwise through the ferrule. An optical fiber extends through the bore defined by the ferrule such that a first end of the optical fiber is exposed at the first end of the ferrule. The optical fiber consists of a core and a cladding layer which surrounds the core. The core extends beyond the cladding at the first end of the optical fiber to facilitate contact of the protruding core with a core of a second optical fiber, which may be mounted in a second fiber optic connector.

In a preferred embodiment, the protruding core at the first end of the optical fiber extends beyond the cladding by at least about 5 nanometers and by no more than about 500 nanometers. The end of the protruding core is preferably within about ±50 nanometers of the end of the ferrule.

Therefore, according to the present invention, a method of producing core protrusion in an optical fiber mounted in a fiber optic connector is provided. The method includes etching the end of the optical fiber so that the core protrudes beyond the cladding layer and fine polishing the protruding core thereby providing a protruding core without undercut or depressions in the core of the optical fiber. The protruding core may then be polished with a laser. Accordingly, the end face geometry of the optical fiber is controlled so that the return loss performance of the connector is significantly improved. Also, according to the present invention a fiber optic connector with a protruding core relative to the cladding is also provided. The core protrudes beyond the end of the cladding to improve contact and thus reduce reflectance when mated with a second fiber optic connector.

BRIEF DESCRIPTION OF THE DRAWINGS

FIG. 1 is a perspective view illustrating the step according to one embodiment of the present invention of polishing the end of the optical fiber mounted in a fiber optic connector.

FIG. 2A is a cross-sectional side view illustrating the step of applying the etching solution to the end of the optical fiber mounted in a fiber optic connector.

FIG. 2B is a cross-sectional side view illustrating the step of etching the end of the optical fiber to produce core protrusion relative to the cladding.

FIG. 2C is a cross-sectional side view illustrating the step of terminating the etching step by applying a neutralizing solution.

FIG. 2D is a cross-sectional side view of an optical fiber showing a protruding core which exhibits cupping after terminating the etching step.

FIG. 3 is a schematic view illustrating the step of irradiating the optical fiber with a laser.

DETAILED DESCRIPTION OF THE PREFERRED EMBODIMENT

The present invention will now be described more fully hereinbelow with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete and will fully convey the scope of the invention to those skilled in the art. Like numbers refer to like elements throughout.

Figure 5:
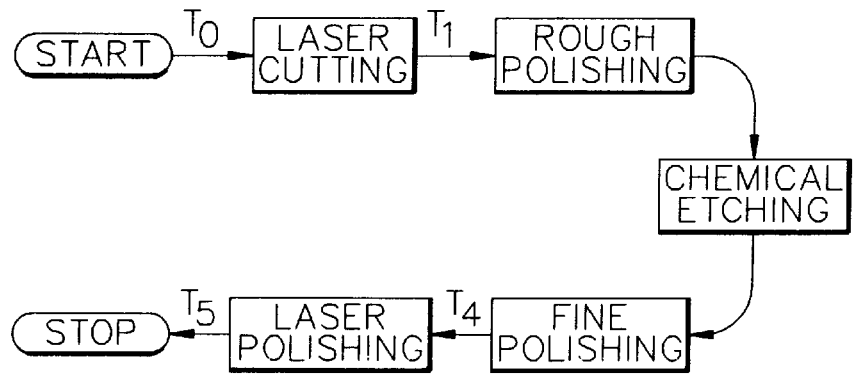
FIG. 5 is a schematic diagram showing the steps of a preferred embodiment of the present invention.

Referring now to FIG. 5, the sequence of steps according to a preferred embodiment of the present invention is illustrated. First, a laser is used to remove excess fiber and adhesive from an end of a connector ferrule. Next, the end of the ferrule is rough polished in order to form a convex surface. The optical fiber in the ferrule is then etched with a solution which preferentially removes the cladding. The resulting protruding core is then fine polished to remove any recess or undercut in the core resulting from the etching process. Finally, the protruding core is irradiated with a laser to provide a smooth surface for contact with a second optical fiber which may be mounted in another ferrule. Alternatively, the protruding core resulting from the etching step may be irradiated with a laser followed by fine polishing or may simply be irradiated with a laser.

Figure 6:
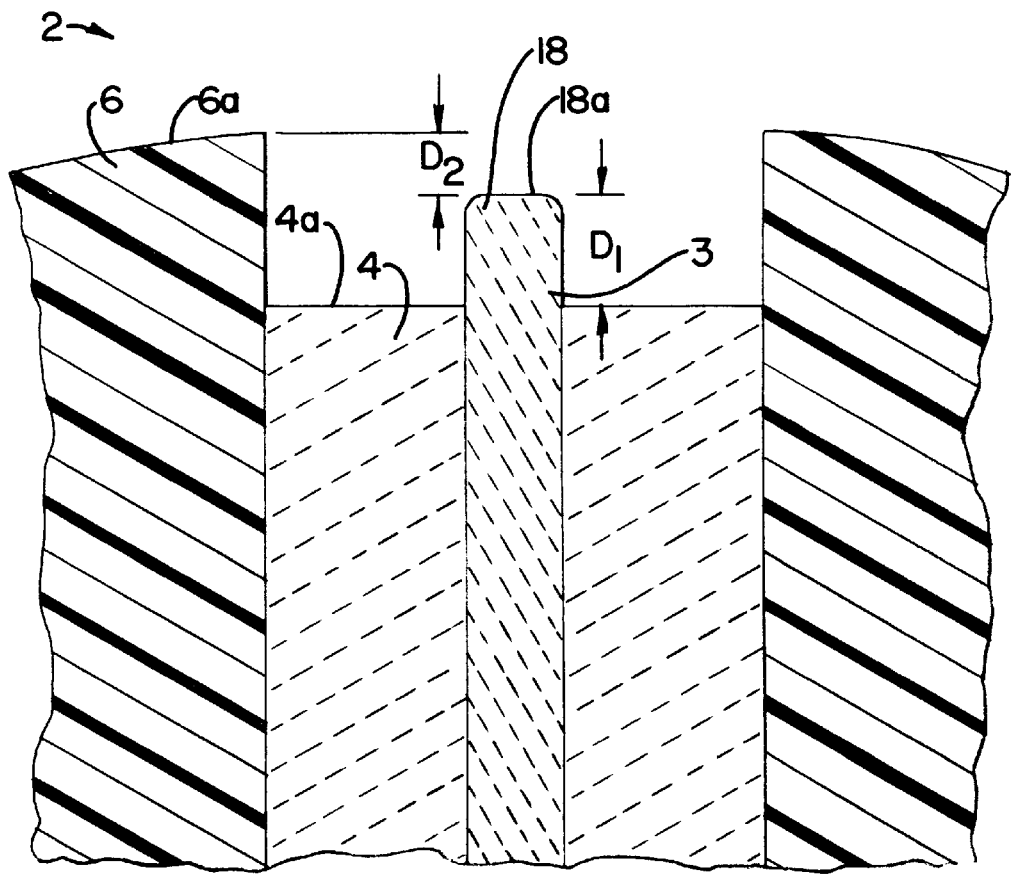
FIG. 6 is a greatly enlarged cross-sectional side view illustrating a fiber optic connector made in accordance with the present invention.

The improved fiber optic connector as shown in FIG. 6 results from the protrusion of the core of the fiber beyond the cladding. As a result of the etching process, the optical fiber may be recessed below the end of the ferrule. The present invention, however, is directed to the protrusion of the core relative to the cladding and not to the position of the end of the optical fiber relative to the end of the ferrule. Due to the small size of the fiber relative to the ferrule, the drawings do not reflect the true relative sizes of the core, cladding, and ferrule.

Figure 4A:
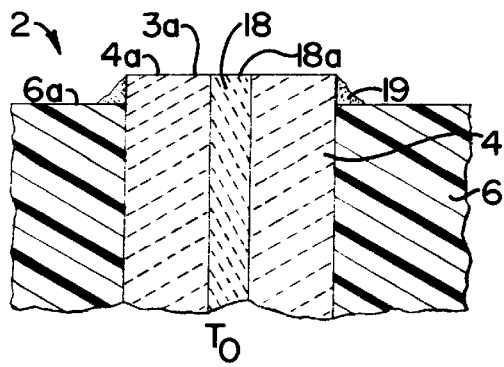
FIGS. 4A–4F are sequential cross-sectional side views of the optical fiber mounted in a fiber optic connector during processing according to a preferred embodiment of the present invention as illustrated in FIG. 5.

Referring to FIG. 4A, the optical fiber 3 at time $T_0$ is mounted in a ferrule 6 of the fiber optic connector 2 prior to the first step of removing the excess fiber using a laser. The optical fiber includes a core 18 surrounded by a cladding layer 4. The end 18a of the core and the end 4a of the cladding extend beyond the end 6a of the ferrule. Excess adhesive 19 is present at the interface of the cladding 4 and the end of the ferrule. In the first processing step, a laser beam is directed at the protruding optical fiber in order to remove the optical fiber and adhesive extending beyond the end of the ferrule as shown at Time $T_1$ in FIG. 4B. This initial step of using laser cutting to remove excess fiber and adhesive is disclosed in U.S. Pat. No. 5,421,298 to Knecht, et al. and is not further illustrated herein.

After laser cutting, the ferrule 6 is then rough polished. Referring to FIG. 1, the step of rough polishing is illustrated. The ferrule 6 is held so that the end of the ferrule may be placed against a lapping film or pad 10 which is supported by a mechanical polishing turntable 8. The film or pad may be a carborundum film, a diamond film, an aluminum film, or a silicon carbide film. Preferably, a one micron silicon carbide film is used for rough polishing. Additionally, a slurry 12 may be used with the polishing film or pad. A 0.014 micron fumed silica slurry is preferably used according to the preferred embodiment of the present invention. The ferrule is polished so that a convex or curved surface is formed on the end 6a of the ferrule 6. The end of the optical fiber 3a is located at the apex of the convex end of the ferrule.

Figure 4B:
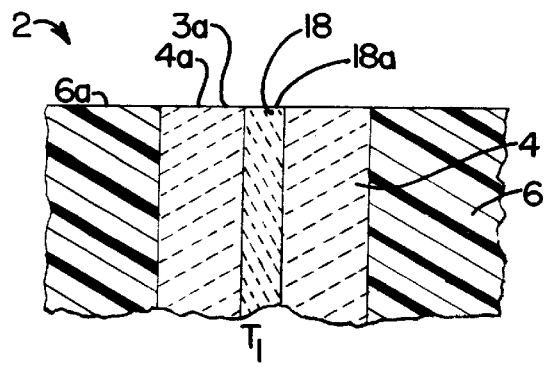
Figure 4C:
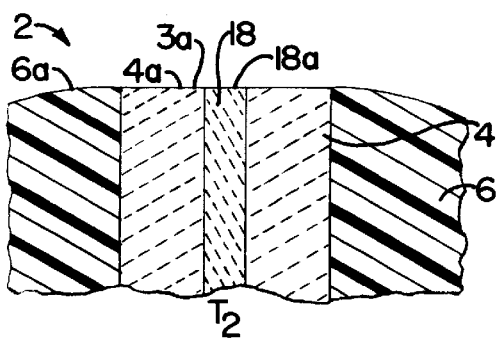

The fiber optic connector resulting from the rough polishing step is illustrated at $T_2$ of FIG. 4B. As noted above, the end 6a of the ferrule of the fiber optic connector 2 is convex shaped. The end 18a of the core and the end 4a of the cladding are generally even with the end 6a of the ferrule.

FIGS. 2A–2D illustrate the preferred etching process which preferentially removes the cladding layer from around the core. This process includes etching the end 3a of the optical fiber with a solution 16 followed by terminating the etching with a neutralizing solution 20. FIGS. 2A and 2B illustrate the etching step while FIGS. 2C and 2D illustrate the terminating step. The etching step is accomplished by applying a microdot of an etching solution 16 on the face of the optical fiber 3a. A small syringe 14 may be used to deposit a very small amount of etching solution on the end of the optical fiber as shown in FIG. 2A. Alternatively, the end of the ferrule containing the end of the optical fiber may be dipped into an etching solution or otherwise brought into contact with an etching solution by any other means which is sufficient to apply an adequate amount of etching solution on the end of the optical fiber.

The etching solution 16 is preferably a buffered 5 percent hydrofluoric acid solution with ammonium fluoride as the buffering agent. Other solutions which are capable of etching glass, such as caustic solutions, may be used although are not preferred unless the epoxy-based adhesive used to secure the optical fiber in the ferrule will not be weakened, dissolved or otherwise adversely affected by the etching solution. The etching step preferably takes place between 5 and 60 seconds although this time will vary depending upon the concentration of etching solution. The etching time may also vary depending upon the type of etching solution used. Therefore, a weaker etching solution will result in longer required etching times in order to achieve the required core protrusion. For example, using a 5 percent buffered hydrofluoric acid solution may require about 30 seconds to produce core protrusion of 5 to 10 nm, while more dilute solutions may require anywhere from 60 seconds to 5 or 10 minutes or more.

As reflected in FIG. 2B, the etching solution 16 dissolves the end 4a of the cladding layer so that the end 18a of core protrudes beyond the end of the cladding. This selective etching of the core 18 with respect to the cladding 4 is believed to take place because the germania dopant added to the core in order to increase the refractive index of the core acts as an inhibitor to the buffered hydrofluoric acid solution. It is preferred that the etching solution be buffered because it is believed that a non-buffered hydrofluoric solution will preferentially etch the core over the cladding because the germania appears to act as an accelerant to a non-buffered hydrofluoric acid solution. If the core is doped with a compound other than germania which does not act as an inhibitor to a buffered hydrofluoric acid solution or if the cladding is doped instead of the core, the etching solution must be carefully selected so that the cladding is preferentially etched instead of the core.

As illustrated in FIG. 2C, the etching step is terminated by applying a neutralizing solution 20 to the end 18a of the optical fiber. Any solution which is capable of neutralizing the etching solution may be used to terminate the etching step. Alternatively, the etching step may be terminated by rinsing or washing the end 3a of the optical fiber with water. The end of the optical fiber is then dried by air or with heat, and the resulting optical fiber with a protruding core 18a is shown in FIG. 2D. The etching step may also leave the surface of the protruding core relatively rough and uneven as illustrated in FIG. 2D. If this occurs, additional steps of fine polishing and irradiating the protruding core with a laser are preferred as discussed further below.

When properly carried out, the etching step provides sufficient protruding core of preferably about 25 or 50 to 100 nanometers to eliminate the possibility of core undercut relative to the cladding resulting from the final step of irradiating the end of the protruding core with a laser. The etching process may be employed to produce core protrusion of more or less than about 25 or 50 to 100 nanometers as may be desired. Additionally, the protruding core provides more surface area for the final irradiating step so that the laser energy per unit area of exposed optical fiber is less than with a flat core thus lessening the likelihood of over processing which can result in core undercut relative to the cladding.

Figure 4D:
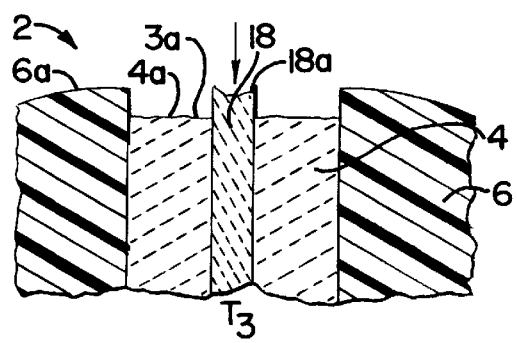

The fiber optic connector 2 shown at time $T_3$ in FIG. 4D illustrates the fiber optic connector after the etching process is completed. The end 18a of the core protrudes beyond the end 4a of the cladding. The ends of the core and the cladding may be somewhat uneven or rough from the etching process. Because the germania dopant in the core 18 may not be distributed evenly across the core, the end of the core may be uneven or possibly cupped in the center of the core due to lower levels of germania in the central area of the core. Accordingly, in a preferred embodiment, the protruding core is fine polished after the etching process to remove any undercut. The fine polishing step is also used to control the final amount of core protrusion.

FIG. 1 also generally illustrates the step of fine polishing the end 18a of core of the optical fiber after the etching process is terminated. The connector 6 is placed over a polishing film or pad 10 which has been placed on turntable 8. In this step the film may be an aluminum or silicon dioxide film. The film may be used in connection with a slurry 12 consisting of colloidal silica. Preferably, a colloidal silica suspension having a pH of between 8 and 11 and, more preferably, of 10.5 is used on a soft synthetic wool pad. Such pads are well known in the art and available commercially. The silica in the suspension preferably has a particle size of 0.004 to 0.05 microns. The pH of the solution affects, however, the floc size (aggregation of silica particles in the slurry) of the colloidal suspension so at lower pH the floc size is smaller, resulting in a smoother finish on the end of the optical fiber. As the pH increases, the floc size increases resulting in rougher finish. A colloidal silica slurry having a pH of about 10.5 provides the optimum medium for polishing the core to remove uneven surfaces yet provide a relatively rough surface for final polishing with a laser 28 as shown in FIG. 3. It has been discovered that a relatively rough surface on the end of an optical fiber provides a better surface for laser polishing than a relatively smooth surface, thereby resulting in a smoother surface after laser polishing.

Figure 4E:
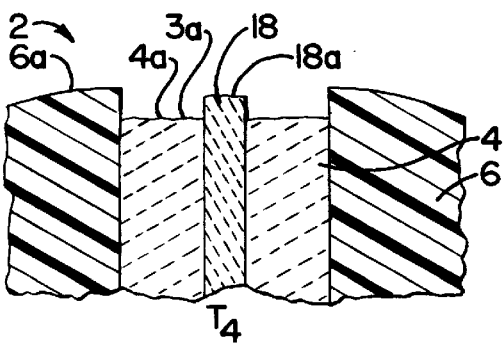

The connector 2 shown at time $T_4$ of FIG. 4E illustrates the connector after the fine polishing step. The amount which the end 18a of the core protrudes beyond the end 4a of the cladding has been reduced by up to about 95% and preferably by about 50% depending upon the amount of core protrusion present after the etching process. Preferably, after the fine polishing step, the end 18a of the core protrudes at least 5, 10, 15, or 20 nanometers beyond the end 4a of the cladding and preferably between 25 and 50 nanometers beyond the end of the cladding.

As illustrated in FIG. 3, the final step of irradiating the end of the protruding core 18a is carried out using a laser, such as a water cooled $CO_2$ laser 28 operating in a low duty cycle pulsed mode of operation. The laser 28 of one advantageous embodiment includes a long life, sealed off 30 centimeter discharge length, 8 millimeter bore laser tube, a 135 line/millimeter LITTROW mounted grating 30 with a 95 percent reflectivity, one meter radius plano concave output coupler 26 with a cavity length of 60 centimeters. According to this embodiment, tuning the laser 28 is accomplished by rotating the grating 30 in the horizontal plane. Due to the narrow band width of $CO_2$ laser lines, it is necessary to adjust cavity length in order to lase on the line center. Cavity length adjustment may be made using an electromagnetic transducer. While a continuous wave $CO_2$ laser is described above, the method of the present invention can employ a variety of other lasers without departing from the spirit and scope of the present invention.

According to one advantageous embodiment, residual zero-order radiation from the grating 30 is detected by pyroelectric detector 32 and used to monitor the laser energy output. An electro-mechanical shutter can be mounted on the output side of the laser 28 in order to prevent laser radiation from hitting the optical fiber during adjustment of the laser.

A Brewster angle polarizer 24, consisting of two opposed ZnSe Brewster windows can be used to attenuate the laser output, thereby controlling the peak power incident on the end 3a of the optical fiber. A 50 millimeter focal length, positive meniscus, AR coated lens 22 is used to focus the laser beam 34 on the end of the optical fiber. The lens preferably contains an X-Y adjustment to allow for alignment of the beam to the end 3a of the optical fiber whereby the focus spot size can be adjusted using a focusing ring.

The laser power preferably peaks quickly and then decline rapidly to achieve vaporization and avoid bulk melting of the glass on the end 3a of the optical fiber. As discussed above, the core protrusion provided by the etching process helps eliminate the possibility of core undercut due to the this laser irradiating step. The laser irradiating step further smoothes the surface of the end of the optical fiber, thereby providing superior return loss performance.

Figure 4F:
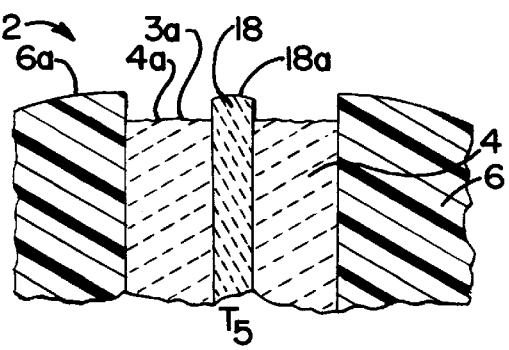

The connector 2 shown at time $T_5$ of FIG. 4F illustrates the connector after the final irradiating step is complete. The end 18a of the core of the optical fiber protrudes beyond the end 4a of the cladding of the optical fiber by at least 5 nanometers and preferably about 25 to 50 nanometers. The surface of the end of the core is smooth thereby providing excellent contact with a second optical fiber mounted in another fiber optic connector.

Referring to FIG. 6, a fiber optic connector 2 according to one embodiment of the present invention is illustrated. The connector includes preferably a 2.5 mm ferrule 6. The ferrule is preferably made of zirconia or stainless steel. An optical fiber 3 is mounted in the bore of the ferrule. The optical fiber includes a doped core 18 and a cladding layer 4. The cladding layer 4 generally does not contain any dopant unless the core is not doped. As a result of the above-described processing steps, the end 18a of the core protrudes relative to the end 4a of the cladding layer. Preferably, the end 18a of the core protrudes at least 5, 10, 15 or 20 nanometers beyond the end 4a of the cladding and more preferably at least about 20 nanometers beyond the end of the cladding as reflected by the dimension $D_1$ in FIG. 6. The optimum amount of protrusion is approximately 25–50 nanometers although the optimum distance may vary depending on the relationship of the end 18a of the core to the end 6a of the ferrule. Preferably, the end of the core will be ±100 nanometers within the end 6a of the ferrule as illustrated by the dimension $D_2$ in FIG. 6. In other words, the end of the core will generally not protrude more than 100 nanometers beyond the end of the ferrule nor will the core generally be recessed more than 100 nanometers beyond the end of the ferrule although greater distances may be allowable. The ferrule is sufficiently resilient to allow the end 18a of the core of the optical fiber to come into contact with the end of the core of a second optical fiber even if the core of the optical fiber is recessed somewhat below the end 6a of the ferrule.

Therefore, according to the present invention, a method for providing core protrusion relative to the cladding in an optical fiber mounted within a ferrule in order to improve return loss performance is provided. In particular, the method includes an etching step which selectively etches the cladding of the optical fiber relative to the core thereby providing core protrusion relative to the cladding. The increased surface area resulting from the core protrusion helps to avoid undercutting in any subsequent irradiating step using a laser. Thus, the method of providing core protrusion in an optical fiber mounted within a fiber optic ferrule improves core-to-core contact in fiber optic connectors and therefore superior return loss performance. Also provided is a fiber optic connector having an optical fiber which is mounted within a ferrule and which has a protruding core with respect to the cladding layer.

In the drawings and specification there has been set forth a preferred method of the invention and, although specific terms are employed, the terms are used in a generic and descriptive sense only and not for the purpose of limiting the scope of the invention being set forth in the following claims.

That which is claimed is:

1. A method of producing core protrusion relative to cladding in an optical fiber mounted in a ferrule, said optical fiber having a core surrounded by a cladding layer, said core and said cladding of the optical fiber extending between opposed ends, said method comprising the steps of:

etching a first end of said core and a first end of said cladding of the optical fiber with a solution, said etching step comprising removing said cladding from around said core so that the end of said core protrudes beyond the end of said cladding; and smoothing the first end of said core, following said etching step, so that the first end of said core can be operably mated to a core of another optical fiber.

2. The method according to claim 1 wherein the etching step causes a cavity in the first end of core and said smoothing step comprises fine polishing the first end of said core to smooth the cavity and provide a relatively even first end of said protruding core.

3. The method according to claim 1 wherein said smoothing step comprises irradiating the first end of said core with a laser.

4. The method according to claim 1 wherein the etching step causes a cavity in the first end of core and said smoothing step comprises fine polishing the first end of said core to smooth the cavity and irradiating the first end of said core with a laser.

5. The method according to claim 2 wherein said fine polishing step comprises polishing the first end of said core with a film to provide a relatively even first end of said protruding core.

6. The method according to claim 2 wherein said fine polishing step comprises polishing the first end of said core with a colloidal silica slurry.

7. The method according to claim 1 wherein said etching step comprises etching the first end of said core and first end of the cladding of the optical fiber for a period of about 1 to 600 seconds.

8. The method according to claim 1 further comprising terminating said etching step once the end of said core protrudes beyond the end of said cladding by between about 5 to 500 nanometers.

9. The method according to claim 8 wherein said terminating step comprises applying a neutralizing solution to the first ends of said core and cladding.

10. The method of producing core protrusion in an optical fiber, said optical fiber having a core surrounded by a cladding layer, said optical fiber extending between opposed ends, said method comprising the steps of:

etching a first end of said optical fiber with a solution, said etching step comprising removing said cladding from around the first end of said core so that said core protrudes beyond said cladding;

fine polishing the first end of said protruding core; and irradiating said protruding core with a laser, following said fine polishing step, to smooth said core to facilitate contact on the end of a core of a second optical fiber.

11. The method according to claim 10 further comprising the step of rough polishing the end of said optical fiber with a lapping film prior to said etching step.

12. The method according to claim 10 wherein the step of fine polishing the first end of said protruding core comprises polishing the first end of said protruding core with a colloidal suspension of silica.

13. The method according to claim 10 wherein the step of fine polishing the first end of said protruding core with a colloidal suspension of silica further comprises polishing the first end of said protruding core with a colloidal suspension of silica having a pH of between about 8 and 11.

14. The method according to claim 10 wherein said etching step comprises etching the first ends of said core and said cladding for a period of about 1 to 600 seconds.

15. The method according to claim 10 further comprising a step of terminating said etching step once the end of said core protrudes beyond said cladding by between about 5 to 500 nanometers.

16. The method according to claim 15 wherein said terminating step comprises applying a neutralizing solution to the first ends of said core and said cladding.

17. The method according to claim 15 wherein said terminating step comprises rinsing the first ends of said core and said cladding with water.

* * * * *